Aug. 1, 1950  H. HARRS  2,517,308
SLIDE JOINT
Filed Jan. 17, 1947  2 Sheets-Sheet 1
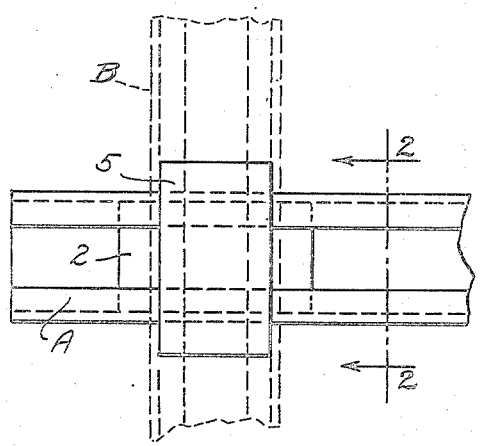
Fig. 1
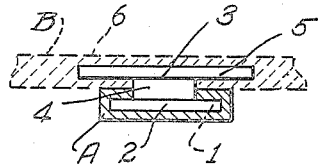
Fig. 2
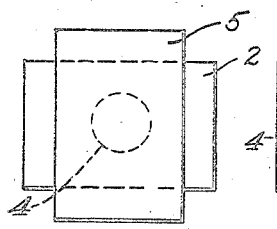 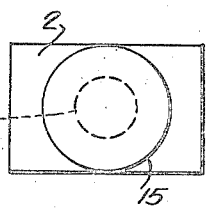 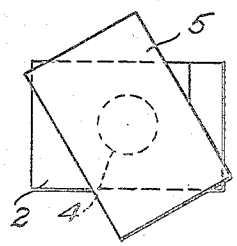 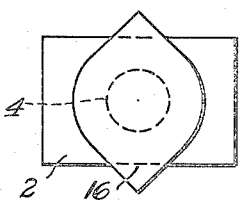
Fig. 3  Fig. 4  Fig. 5  Fig. 6
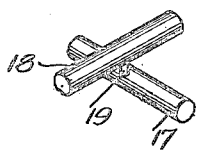 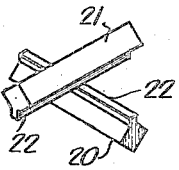 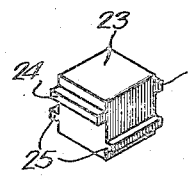 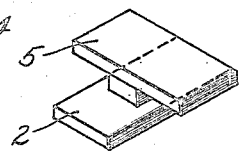
Fig. 7  Fig. 8  Fig. 9  Fig. 10
Inventor
Henry Harrs
By McMorrow, Berman & Davidson
Attorneys Aug. 1, 1950 — H. HARRS — 2,517,308
SLIDE JOINT
Filed Jan. 17, 1947 — 2 Sheets-Sheet 2

Inventor
Henry Harrs

By McMorrow, Berman & Davidson
Attorneys

Patented Aug. 1, 1950

2,517,308

UNITED STATES PATENT OFFICE 2,517,308

SLIDE JOINT

Henry Harrs, Flushing, N. Y.

Application January 17, 1947, Serial No. 722,562

1 Claim. (Cl. 287—49)

This invention relates to a new and improved slide joint and more particularly and specifically to a slide joint structure adapting two members to be interconnected at a fixed or variable angle.

The primary object of this invention resides in the provision of a slide joint which adapts two members to be positioned in any desired fixed or variable angular relationship to one another throughout the full length of each member.

Another object of this invention resides in the provision of a slide joint of the character described which would be highly useful in application to the construction of protractors, adjustable squares, triangular computors, stretching frames and many other tools, machines and instruments requiring sliding engagement.

Still another object of this invention is the provision of a slide joint of the character described which is quickly and easily operable to place the two members in any desired angular relationship, either fixed or variable, and which is of extremely simple and inexpensive design and durable and long-lasting in use.

Further objects and advantages of this invention will readily appear to those skilled in the art when the following description is read in the light of the accompanying drawings in which:

Fig. 1 is a top plan view of two members slidably secured at right angles.

Fig. 2 is a vertical cross section taken on line 2—2.

Fig. 3 shows the arrangement for right angular positioning.

Fig. 4 illustrates the means for unlimited angular positioning.

Fig. 5 illustrates a definite angular position.

Fig. 6 illustrates a limited variable angular positioning.

Figs. 7, 8, 8A, 9 and 10 illustrate various possible applications of this slide joint.

The present invention is particularly concerned with a connecting element for interconnecting two elongated members angularly disposed relative to each other for relative sliding movement.

Essentially the improved connecting element comprises two spaced-apart heads or head portions connected together by a reduced stem so that they are substantially parallel and rotationally disposed relative to each other to position the two elongated members inter-connected thereby at the desired angular relationship.

The elongated members A and B are flat members, each having two internal grooves, one adjacent each edge thereof, and a longitudinal opening in one side communicating with both grooves to provide a member having a slot of somewhat T-shaped cross-section. The two grooves slidably receive the opposite edges of a connecting element head and the stem of the connecting element extends through the longitudinal opening in the elongated member.

The connecting element may assume various specific shapes some of which are illustrated in Figures 3 to 10 inclusive.

The connecting element shown in Figure 3 has two flat, rectangular heads 2 and 5, which are substantially parallel, concentric and perpendicular to each other. These heads are spaced apart and interconnected by a stem 4, preferably of circular cross-section although it may have a square or rectangular shape, as illustrated in Figure 10, or any other desired cross-sectional shape. The stem has a diameter less than the width of the two heads and such as to slide freely in the longitudinal openings of the two elongated members A and B and the length of the stem is such as to hold the adjacent, slotted sides of the two elongated members substantially in contact. The heads have a width providing a close sliding fit in the T-shaped slots of the elongated members and a length sufficient to preclude any turning of the elongated members on the respective heads.

The form of the invention shown in Figure 5 is the same as that shown in Figure 3, except that the two heads are disposed at an angle of other than 90-degrees to each other to hold the two elongated members in a desired angular relationship other than relatively perpendicular.

In Figure 4 one of the heads, as designated at 15, is made circular to provide for free rotational movement of one of the elongated members relative to the other about the center of the stem.

In Figure 6 one of the heads, 16, is modified to a pointed, somewhat elliptical shape to provide free rotational movement of the corresponding elongated member through an angle of approximately 90-degrees while precluding complete rotation of such member about the center of the corresponding stem.

Figure 7 shows a modified connecting element in which the two perpendicularly-disposed heads 17 and 18 are in the shape of cylinders of circular cross-section inter-connected at their mid-length locations by a stem 19 of circular cross-sectional shape.

Figure 8A:
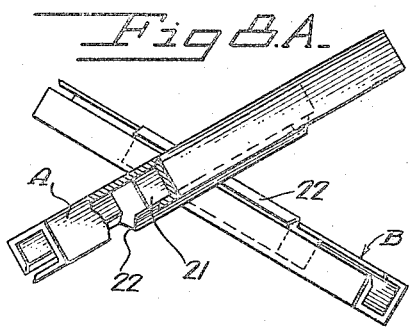

In Figure 8 the modified connecting element has two heads 20 and 21 which are cylindrical prisms of substantially square cross-sectional shape each having along one edge a rib 22 of rectangular cross-sectional shape. The ribs 22 are joined together, either at their mid-length location, as illustrated, or at some other desired location, to secure the two heads 20 and 21 together in any desired angular relationship, such as the right-angle relationship illustrated.

The modified connecting element shown in Figure 9 comprises a cubicle block 23 having two pair of ribs thereon with one pair disposed adjacent each of two opposite ends of the block. The ribs 24 of one pair are provided one on each of two opposite sides of the block near the corresponding end of the block and the ribs 25 of the other pair are provided one on each of the two remaining sides near the opposite end of the block. The slots in the elongated members will, of course, be shaped to correspond to the ribbed end portions of block 23.

Figure 12:
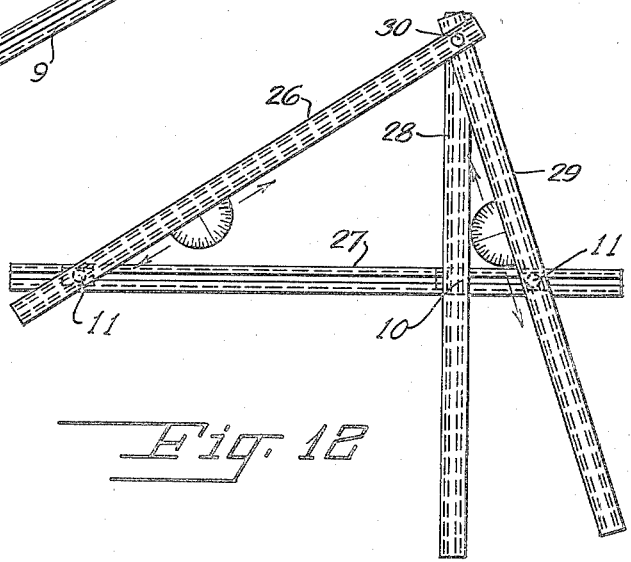

The protractor instrument illustrated in Figure 12 has a number of bars which are slidably interconnected and can be arranged to locate various points and directions on a chart and the angular intervals between such points and directions.

This instrument is illustrative of the application of the connecting elements hereinabove described and includes a plurality of elongated members, as indicated at 26, 27, 28 and 29. Members 26, 28 and 29 are pivotally secured together at corresponding ends, as indicated at 30, members 26 and 29 are slidably and rotationally connected to member 27 by connectors 11, as illustrated in Figure 4, and member 28 is slidably, but non-rotationally connected to member 27 by a connecting element, such as shown in Figure 3.

Figure 11:
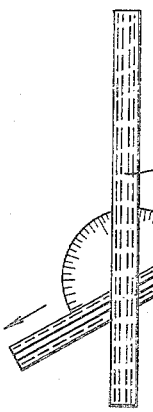
Figs. 11 and 12 illustrate the possible application of this type slide joint to protractors and geometrical instruments.

Fig. 11 illustrates the use of a definite angular head in a protractor where the elongated cross members 8 and 9 of the protractor are slidably connected together by a connecting element which holds the elongated members at a set and predetermined angle to one another.

Figure 13:
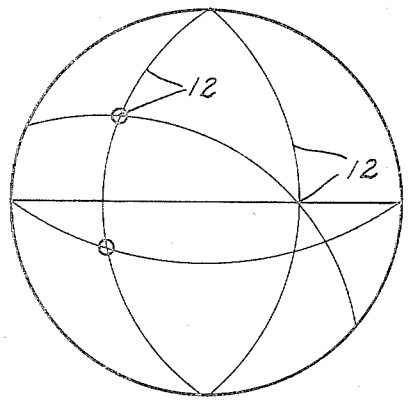
Fig. 13 illustrates the coverage of a great circle by the use of a combination of these slide joints.

Fig. 12 discloses a multiple protractor useful as a navigation instrument to plot great circle courses, as shown in Figure 13.

It can thus be readily seen that a wide range and variety of head constructions have been and can be perfected for desired positioning of the two members A and 7 relative to one another.

It may also be seen that a means of forming a slide joint between two members having unlimited possibilities in application to many instruments and machines has been provided by this invention.

Consequently having thus described and explained this invention and with full conviction that any modifications or alterations in size, shape and configuration and means of application to various instruments and machines would not in any way depart from the spirit of this invention what I desire to claim and secure by Letters Patent is:

A connecting element for slidably interconnecting two crossed-over, elongated members each provided with a longitudinal slot opening to one side of the member comprising a pair of substantially parallel, concentric heads each slidably receivable in a corresponding elongated member slot and disposed at right angles to each other, each of said heads comprising an elongated, prism of square cross-section having along one edge thereof a rib of rectangular cross-section, said ribs being secured together at their mid-length locations to interconnect said head prisms against relative rotational movement.

HENRY HARRS.

REFERENCES CITED

The following references are of record in the file of this patent:

UNITED STATES PATENTS

| Number | Name | Date |
| --- | --- | --- |
| 2,066,255 | Dempsey | Dec. 29, 1936 |
| 2,340,911 | Urbain | Feb. 8, 1944 |
| 2,277,703 | Kennedy et al. | Mar. 31, 1942 |
| 2,435,256 | Whitmore | Feb. 3, 1948 |

FOREIGN PATENTS

| Number | Country | Date |
| --- | --- | --- |
| 572,592 | Great Britain | of 1945 |